United States Patent [19]

Marandet et al.

[11] Patent Number: 4,496,867
[45] Date of Patent: Jan. 29, 1985

[54] ELECTRIC RETARDERS FOR VEHICLES

[75] Inventors: André J. P. Marandet, Saint Gratien; Marc Charbonnier, Franconville, both of France

[73] Assignee: Labavia -S.G.E., France

[21] Appl. No.: 577,023

[22] Filed: Feb. 6, 1984

[30] Foreign Application Priority Data

Feb. 10, 1983 [FR] France ................................ 83 02141

[51] Int. Cl.³ ............................................ H02K 49/00
[52] U.S. Cl. ...................................... 310/93; 310/103; 310/268
[58] Field of Search .................... 310/92, 93, 103, 268

[56] References Cited

U.S. PATENT DOCUMENTS

| 2,751,513 | 6/1956 | Bessiere | 310/268 X |
| 2,830,206 | 4/1958 | Bessiere | 310/268 X |
| 2,833,948 | 5/1958 | Bessiere | 310/93 |
| 3,496,396 | 2/1970 | Jollois | 310/93 |

Primary Examiner—Donovan F. Duggan
Attorney, Agent, or Firm—Larson and Taylor

[57] ABSTRACT

An electric retarder is provided for braking the transmission shaft (A) of a vehicle, in which the stator comprises at least one ring of coils (1) supported by a transverse plate (2) itself stiffened by a rib. The portion (7) of the stiffening rib of the plate, situated at the level of the axis (X) of the retarder, is disposed inside the ring of coils and is connected by radial extensions (10) each passing between two consecutive coils to outer rib sections (8,9) extending as far as the periphery of the plate. Thus the overall width $L_2$ of the stator may be reduced for a given width l of the ring of coils, which makes standardization of the manufacture of the rotors possible in some cases.

10 Claims, 4 Drawing Figures

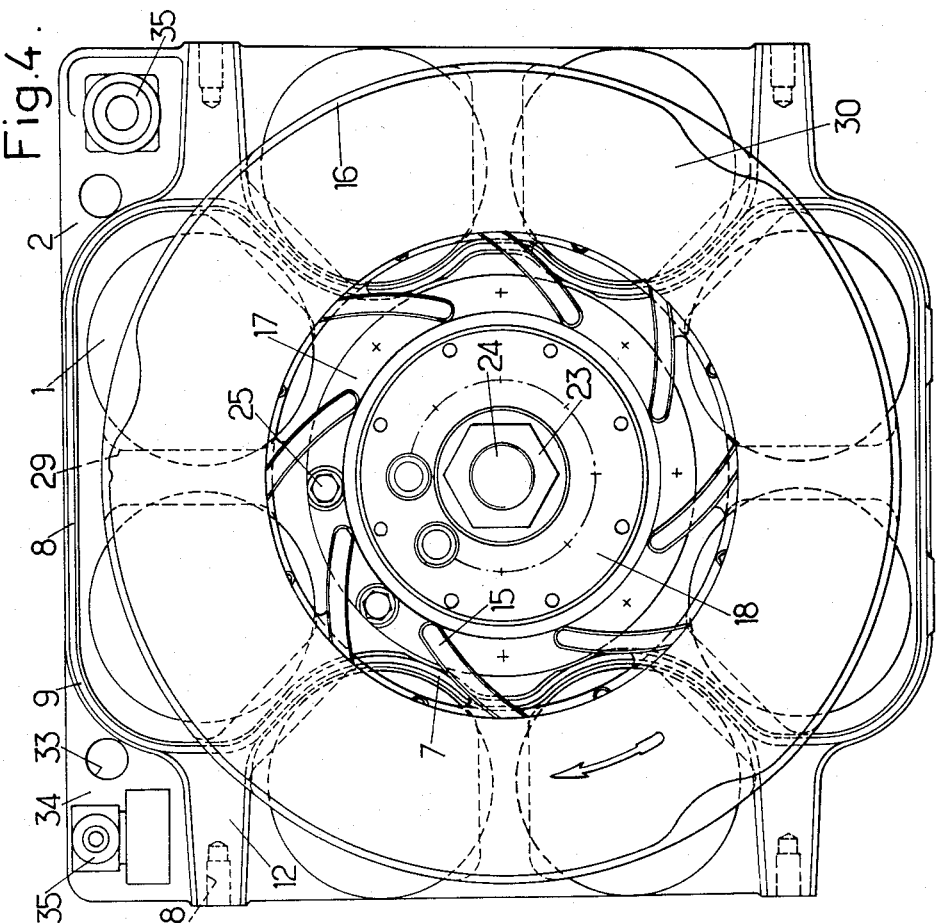
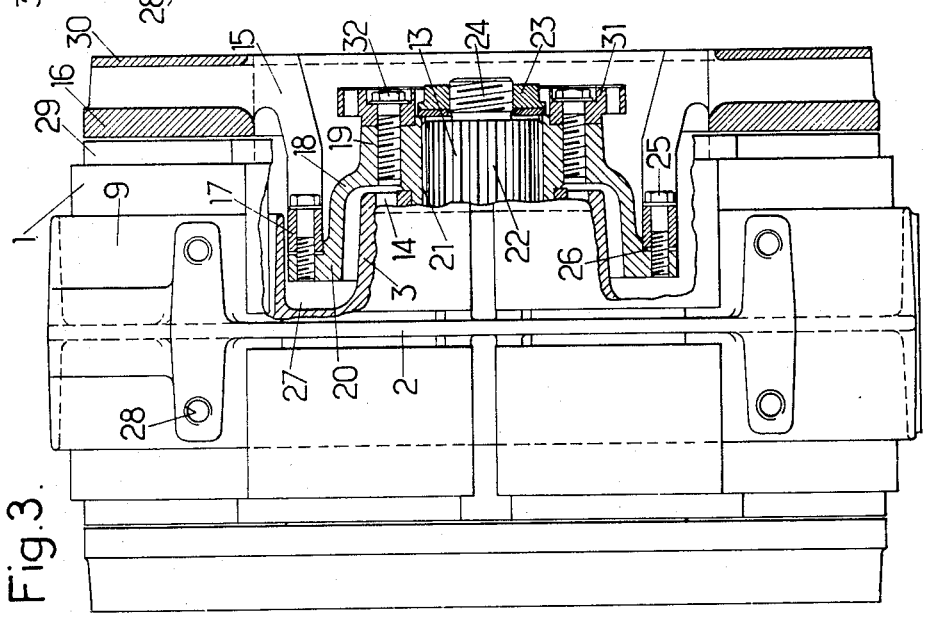

ELECTRIC RETARDERS FOR VEHICLES

The invention relates to electric or "eddy current" retarders for braking the transmission shaft of a vehicle and in which:

the stator comprises at least a ring of coils even in number whose individual axes are all parallel to that of the retarder, the axes of the endmost lateral coils being superimposed in pairs in two vertical planes, and the cores of the different coils being all supported by the same transverse plate having a central bore for letting the shaft to be retarded pass therethrough, and the rotor comprises at least one annular disk made from a ferromagnetic material adapted to travel past said ring, at a small distance therefrom, this disk being fastened to said shaft by successively a ring of arms forming ventilation fins and a fixing ring.

In known embodiments of these retarders, the stator plate is surrounded by a girdle extending perpendicularly to this plate and whose height is equal to a fraction of the axial length of each coil, which fraction is generally between ¼ and ⅜: the purpose of this girdle is essentially to strengthen the plate and accessorily to protect the coils from external aggressions such as projections of mud and stones.

The existence of said girdle over the whole periphery of the plate presents drawbacks in some cases which will be explained in more detail further on with reference to FIG. 1.

It will in particular be seen that the presence of the girdle along the two vertical edges of the plate prevents certain of the rotors manufactured for retarders of the same power of the "cantilever" type being adopted on retarders of the "self-contained" type, for reasons of the horizontal transverse space required.

The aim of the invention is essentially to overcome these disadvantages, which allows in particular mass production of the rotors.

For this, in the stators of the electric retarders according to the invention, the peripheral girdle is replaced by a rib still projecting form the plate in the direction of the axis of the rotor, but this rib no longer extends along the two vertical edges of the plate: at the height of the axis of the retarder, said rib is located inside the ring of coils and its corresponding inner sections are connected by oblique radial extensions each passing between two consecutive coils to outer sections extending as far as the periphery of the plate.

More precisely, said stiffening rib of the plate extends along a closed curve having two halves symmetrical with each other with respect to the axial vertical plane of the retarder and each half of this curve comprises, connected successively together, a horizontal section or substantially such extending above an upper coil, along the upper edge of the plate, a curved section running laterally and outwardly by the side of this coil, an oblique radial section extending towards the axis of the retarder between said coil and the lower adjacent coil, a substantially vertical section inside the ring of coils, an oblique radial section extending outwardly between two coils, a curved section running laterally and outwardly alongside a lower coil and a horizontal section or substantially such extending below this latter lower coil along the lower edge of the plate.

In preferred embodiments, one and/or the other of the following arrangements are used in addition:

in a retarder of the kind considered comprising at least one ring of eight identical coils spaced evenly apart from each other about the axis of the retarder, the upper and lower sections of the stiffening rib are horizontal, its curved sections each extend along an arc of 135° and its oblique radial sections are slanting through an angle of 45° with respect to the horizontal, the vertical edges of the plate are each situated in a vertical plane tangent to two lateral superimposed coils, the stiffening rib of each plate is extended outwardly, at the height of each connection zone between a curved section and an oblique radial section, by a horizontal lug extending outwardly and ending close to the edge of the plate, the plate and its ribs are formed from a single block of cast metal, in the case where the retarder is of the self-contained type, i.e. where its stator is supported by the chassis of the vehicle and where its rotor, inserted between two homokinetic couplings of the transmission shaft, is fixed to an axially end of a journal itself pivotably mounted inside a sleeve which defines the center of the stator blade, said rotor comprises, for supporting each rotor ring, a bell whose large base forms a fixing flange for this ring and whose annular top is fixed to said journal end, and the stator comprises an annular trough adapted to receive with play each assembly formed by such a ring and by such a flange.

The invention comprises, apart from these main arrangements, certain others which are used preferably at the same time and which will be more explicitly discussed hereafter.

In what follows, preferred embodiments of the invention will be described with reference to the accompanying drawings in a way which is of course in no wise limiting.

FIG. 1, of these drawings, shows in a schematical axial view a known embodiment of an electric vehicle retarder stator as well as the side members of the chassis of this vehicle.

FIGS. 3 and 4 show respectively in a lateral view, with parts cut away, and in an end view a retarder equipped with an improved stator in accordance with FIG. 2 above.

Figure 1:
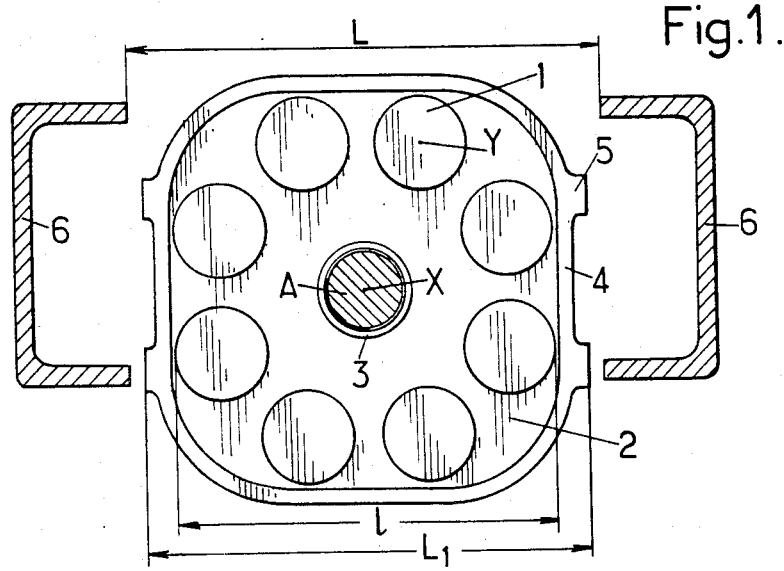

In each case, the stator of the electric vehicle retarder comprises at least one ring of identical coils 1 spaced evenly apart about the axis x of the retarder and each having an axis y parallel to axis x.

The number of these coils is even and could for example be equal to 6 or 10, but is preferably equal to 8 as will be assumed hereafter.

The position of said coils is such that the axes of the lateral endmost coils are superimposed in pairs: the result here is that the axes of the two upper coils are at the same level, and it is the same for the axes of the two lower coils.

The cores of the different coils 1 are all supported by the same transverse vertical plate 2, which has a bore at its center through which passes the transmission shaft A to be retarded of the vehicle, which shaft is coaxial with axis x.

The central bore in question is shaped as a sleeve 3 inside which shaft A is mounted for pivoting by means of appropriate bearings.

Plate 2 is stiffened by a rib 4 extending perpendicular to the mean plane of this plate, i.e. parallel to axis x, over a height which is generally between $\frac{1}{4}$ and $\frac{3}{4}$ of the axial dimension of each coil 1.

In the known embodiments shown schematically in FIG. 1, this rib 4 is a girdle surrounding plate 2.

This girdle 4 has thickened zones 5 which form studs for fixing the stator (1, 2, 3) thus defined on the chassis of the vehicle and in particular on two side members 6 forming part of this chassis, by means of appropriate damped support devices (not shown).

The distance L between these side members 6 is relatively small and, since it cannot be enlarged, the overall transverse horizontal dimension of the retarder must, in some cases, be reduced to a maximum for a given breaking power.

Now, for the above defined stator, this dimension $L_1$ is substantially greater than the overall horizontal dimension l of only the ring of coils 1 considering that it incorporates twice the thickness of girdle 4 and that of the thicker portions corresponding to studs 5.

Furthermore, it is recalled that, for equipping a given heavy truck vehicle with an electric retarder, it is possible to choose between two types of mounting of such a retarder, namely:

"self-contained" mounting, in which the stator is mounted on the chassis of the vehicle, the rotor being mounted on this stator by means of bearings and being itself connected to the rest of the transmission shaft of the vehicle by means of homokinetic couplings, and cantilever mounting, sometimes designated under the trademark "FOCAL", in which the stator is cantilever mounted on the casing of the gear box or of the rear axle of the vehicle, the rotor being also cantilever mounted at the end of a stub shaft extending from this casing.

For reasons of standardization, it would be advantageous, for a given braking power, if the retarders adopted are the same, independently of the type of mounting adopted.

But for cantilever mounting, the arms which support each disk are bent and the diameter of the fixing ring terminating these arms at their end opposite the disk is relatively large so as to house a homokinetic coupling inside the rotor element formed.

These circumstances lead to giving a relatively large diameter to the ring of the coils, which surrounds said ring: for equal performances, the frontal space required by the cantilever mounted retarder is then generally greater than that of the retarder of the same power mounted in a self-contained way.

So as then to be able to use a rotor corresponding to a cantilever mounting on a retarder of the same power mounted in a self-contained or independent way, the overall dimensions of this latter retarder should as a rule be increased.

It will then be readily understood that, under these conditions, the above mentioned limitation for the space available between the side members 7 is sometimes incompatible with the dimensional increase requirement which has just been mentioned.

Practice shows that, in some cases, this limitation makes the universality of adoption of the same rotor for the different mountings proposed effectively impossible.

The invention makes this universality possible by reducing, by a few centimeters, the horizontal transverse space required by the stator of a retarder of an independent type for a given value of the overall horizontal dimension of its ring of coils.

For this, the sections of the stiffening girdle 4 of this stator, which run alongside the two vertical edges of the transverse plate 2, are suppressed and this plate is defined laterally, at each of its two horizontal ends, by a vertical edge V (FIG. 2) situated in the vertical plane tangent to the two corresponding superimposed lateral coils 1.

Furthermore, so as to avoid the rigidity of plate 2 being reduced by the suppression in question, other ribs 7 (FIG. 2) are provided still extending at the same height as the suppressed sections, but inside the ring of coils 1.

Figure 2:
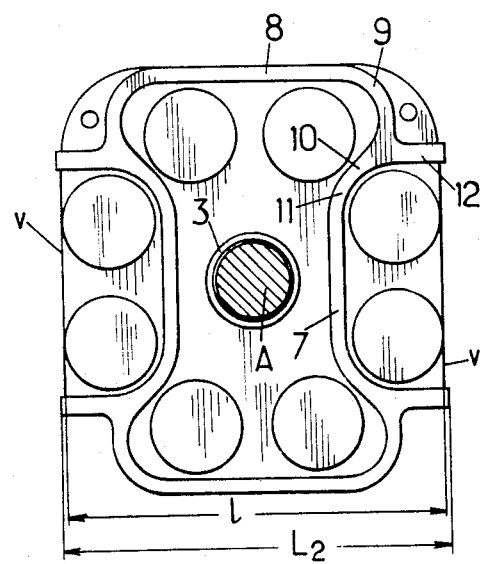
FIG. 2 shows in a schematical axial view a variant of such a stator constructed in accordance with the invention.

In the embodiment shown schematically in FIG. 2, ribs 7 are still rectilinear and vertical, like the suppressed sections of the preceding girdle 4 and are connected to the existing upper and lower sections 8 of said girdle by S connections each passing between two adjacent coils 1.

Each S connection comprises:

a bend 9 extending along an arc of a circle of 135° from one end of one of the horizontal sections 8, a radial section 10 slanting through an angle of 45° with respect to the horizontal and extending towards the axis x from the adjacent end of bend 9, and a bend 11 extending along an arc of a circle of 45° curved in the opposite direction to bend 9.

Each connecting zone between a bend 9 and a section 10 is extended by a horizontal lug 12 extending practically to the level of a vertical edge V of plate 2, or more precisely to a very small distance, of the order for example of 2 to 3 mm, beyond this edge.

Thus, the overall width $L_2$ of the stator considered is very close to the width l: the difference between the width $L_1$ of the previously described known solution and this width $L_2$ is relatively large and generally reaches several centimeters.

In other words, the horizontal transverse space required by the retarder of the independent or self-contained type is reduced for a given value of the overall horizontal width l of its ring of coils.

Or conversely, the new rib system described above, for a given value of the transverse horizontal space required by the retarder, allows the diameter of its ring of coils and all the other diameters which are related thereto to be increased, in particular that of the rotor fixing ring.

In practice, this advantage solved the following particular problem: it was desired to fit on a vehicle whose side members 7 were spaced apart by a given distance L an independent retarder capable of generating a braking torque C, which torque corresponded to an overall width l for the ring of coils according to the solution of cantilever mounting; unfortunately, with the known girdling system, the overall width $L_1$ of the stator corresponding to said ring of coils exceeded the spacing L; it would have been necessary, with the prior constructions, to adopt a ring of coils of smaller diameter for solving the problem posed, and so a different rotor from that adopted for the cantilever mounted retarder; on the contrary, all other things being equal, the gain in space made possible by the invention allowed the above ring of coils to be conserved for the independent mounting considered and so the same rotor to be adopted therefore as for the cantilever mounted retarder.

The adoption of these rotors in the independent or self-contained mounting leads to some structural modifications which will be described with reference to FIGS. 3 and 4.

If we designate by 13 the journal or central hub of an independent retarder, i.e. the portion of the transmission shaft A of the vehicle which is mounted for rotation by means of bearings 14 in the stator sleeve 3, the rotor disks of this retarder are generally mounted at the ends of this journal by means of a ring of arms or fins disposed substantially in the same transverse plane as said end.

In rotors of the cantilever type, as is well known, the arms or fins 15 connecting the disks 16 to the fixing rings 17 are slanting in radial directions, not only in the transverse planes as shown in FIG. 4, but also in axial planes as can be seen in FIG. 3.

Each fixing ring 17 then has a relatively large diameter and is situated inside the corresponding ring of coils 1.

In the present case, for mounting each ring 17 on the corresponding end of journal 13, a bell 18 is used having an annular top 19 and a large base 20 widening out radially.

The annular top 19 is interlocked with the corresponding end of journal 13, angularly by cooperation of complementary longitudinal splines 21, 22 and axially by means of a nut 23, bearing against said top, and screwed onto a threaded end 24 of the journal.

The large widened base 20 forms a flange to which ring 17 is fixed by tightening axial screws 25 easily accessible axially from the outside with interpositioning of spacing washers 26.

In the stator there are further provided, inside sleeve 3, annular "troughs" 27 sufficiently wide for receiving with play the assemblies formed, each one, by a large bell base 20 and the elements supported thereby.

It should be noted that this type of mounting facilitates the adjustment of the air gaps by modifying the thicknesses of the spacers 26, considering the ready accessibility of screws 25.

In the preferred embodiment illustrated, the retarder is symmetrical with respect to the median transverse plane of plate 2: it comprises therefore two identical rings of coils 1 on respectively both faces of this plate, the coils of these two rings being coupled together in twos about common cores passing axially through the plate, and two rotor assemblies each comprising a disk 16, a ring of fins 15 and a fixing ring 17.

The assembly of plate 2 and ribs 7 to 12 projecting respectively from its two faces is preferably formed from a single block of cast metal.

This embodiment allows greater thicknesses to be chosen at will for lugs 12 than for the rest of the ribs, which allows threaded holes 28 to be formed horizontally in the ends of these lugs for receiving fixing screws.

In FIGS. 3 and 4 can be further seen:

widened pole portions 29 terminating coils 1, opposite which the disks 16 travel, the gaps between these portions and these disks defining the "air gaps", an annulus 30 joining together the larger diameter ends of the fins 15 of each wing, which annulus is integrally molded with these fins and with the corresponding disk 16, a fixing flange 31 screwed to the bell top 19 by means of axial screws 32 easily accessible from the outside, holes 33 formed in the upper lateral portions 34, of plate 2, outside the rib 7–12 and serving as levering holes, and electric connection or grounding studs 35 fitted to these plate portions 34.

In FIG. 4 the following can also be seen:

the vertical section 7 of the stiffening ribs of plate 2 are not rectilinear, but have an undulating shape so as to match the contours of the coils 1 and so as to better free the volume of the adjacent trough, which trough is moreover not defined by continuous flanges over the whole of its annular extent, plate 2 does not comprise lower lateral portions external to rib 7-12.

Following which, and whatever the embodiment adopted, the retarder stator is provided whose construction and advantages (more especially the relatively small transverse space occupied, the possibility which results therefrom of standardizing the construction of certain rotors and the simplification of the air gap adjustment) follows sufficiently from what has gone before.

As is evident and as it follows moreover already from what has gone before, the invention is in no wise limited to those of its embodiments and modes of application which have been more especially considered; it embraces, on the contrary, all variations thereof.

We claim:

1. An electric retarder for braking the transmission shaft (A) of a vehicle, in which the stator comprises at least one ring of coils (1) even in number whose individual axes (Y) are all parallel to that (X) of the retarder, with axes (Y) of the endmost lateral coils superimposed in pairs in two vertical planes, the cores of the different coils being all supported by a same transverse plate (2) having in its center a bore for letting the shaft to be retarded pass therethrough and stiffened by a rib projecting therefrom, and in which the rotor comprises at least one annular disk (16) made from a ferromagnetic material adapted for traveling past said ring of coils, at a small distance therefrom, this disk being connected to said shaft successively by means of a ring of arms (15) forming ventilation fins and a fixing ring (17), characterized in that the stiffening rib of plate (2) extends along a closed curve having two halves symmetrical with each other with respect to the axial vertical plane of the retarder and in that each half of this curve comprises, connected successively together, a horizontal section or substantially such (8) extending above an upper coil (1), along the upper edge of the plate (2), a curved section (9) running laterally and externally alongside this coil, an oblique radial section (10) extending towards the axis (X) of the retarder between said coil and the lower adjacent coil, a substantially vertical section (7) inside the ring of coils, an oblique radial section (10) extending outwardly between two coils, a curved section (9) running laterally and outwardly alongside a lower coil and a horizontal section or substantially such (8) extending below this latter lower coil along the lower edge of the plate.

2. The electric retarder according to claim 1, in which each ring of coils comprises eight identical coils (1) spaced evenly apart from each other about the axis of the retarder, characterized in that the upper and lower sections (8) of the stiffening rib are horizontal, in that its curved sections (9) each extend along an arc of 135° and in that its oblique radial sections (10) are slanting through an angle of 45° with respect to the horizontal.

3. The electric retarder according to claim 1, characterized in that the vertical edges (V) of the plate (2) are each situated in a vertical plane tangent to two superimposed lateral coils (1).

4. The electric retarder according to claim 1, characterized in that the stiffening rib of the plate is extended outwardly, at the height of each connection zone between a curved section (9) and an oblique radial section (10), by a horizontal lug (12) extending outwardly.

5. The electric retarder according to claim 4, characterized in that each lug (12) ends a little beyond the vertical edge of the plate and is provided at its end with a threaded hole (28).

6. The electric retarder according to claim 4, characterized in that the plate (2) is free of lateral portions projecting below the lower horizontal lugs (12).

7. The electric retarder according to claim 1, characterized in that each substantially vertical inner section (7) of the stiffening rib has an undulating shape so as to match the contours of the adjacent coils.

8. The electric retarder according to claim 1, characterized in that the plate (2) has two rings of identical coils (1) respectively on its two faces, adapted to coact respectively with two identical disks (16) forming part of the rotor, and in that this plate is ribbed similarly on both its faces.

9. The electric retarder according to claim 1, characterized in that the plate and its ribs are formed from a single block of cast metal.

10. An electric retarder according to claim 1, of the self-contained or independent type, i.e. whose stator is supported by the chassis of the vehicle and whose rotor, inserted between to homokinetic couplings of the transmission shaft, is fixed to at least one axial end of a journal (13) itself pivotably mounted inside a sleeve (3) which defines the bore of the stator plate (2), characterized in that said rotor comprises, for supporting each rotor ring (17), a bell (18) whose large base (20) forms a fixing flange for this ring and whose annular top (19) is fixed to said journal end and in that the stator comprises an annular trough (27) adapted to receive with play each assembly formed by such a ring (17) and by such a flange (20).

* * * * *